Figure 1:
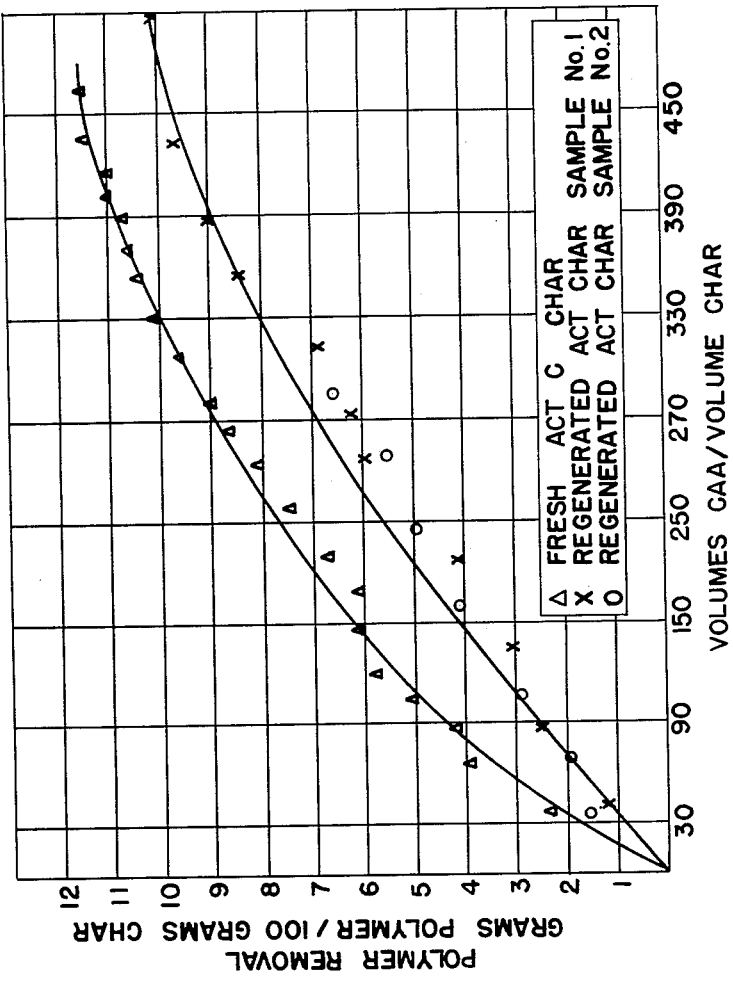

COMPARISON OF POLYMER REMOVAL CAPACITIES OF FRESH AND ISOPROPANOL REGENERATED ACT C CHARS

Arthur Douwe deVries
Malcolm Ernest Wall    Inventors

By *Frank A. Pinnock*    Patent Attorney

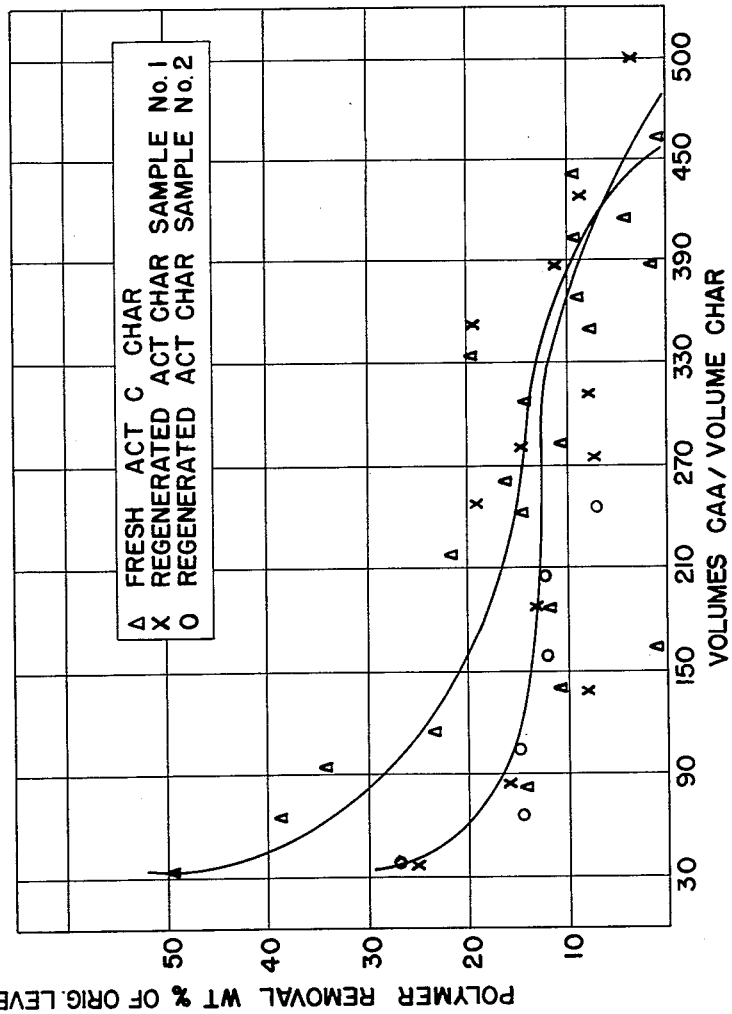

3,040,111
PROCESS FOR REMOVING POLYMER FROM CUPROUS AMMONIA ACETATE SOLUTIONS

Arthur Douwe de Vries and Malcolm Ernest Wall, Baton Rouge, La., assignors to Esso Research and Engineering Company, a corporation of Delaware
Filed Feb. 17, 1960, Ser. No. 9,343
4 Claims. (Cl. 260—681.5)

The present invention relates to an improvement in cuprous ammonium acetate extraction processes utilized in the selective removal of butadiene or small amounts of acetylenes from steam cracking product streams. More particularly, this invention relates in such processes to an improved method for removing the small amounts of high boiling oily polymer formed in the process from the lean stripped CAA solution prior to its recycle to the process. Yet more particularly this invention relates to recovering the char conventionally used to remove said polymer which formerly was discarded after one use. Most particularly, this invention relates to regenerating this spent char by treating it with an alcohol or other solvent for the polymer and utilizing the regenerated char in a char treating zone ahead of a char treating zone supplied with fresh char.

Process for removing small amounts of acetylenes from product streams from steam cracking prior to butadiene extraction are well known at this time. Thus, such a process utilizing cuprous ammonium acetate is described for example in U.S. Patent 2,847,487. Likewise, processes for extracting butadiene either with or without a prior pretreat to remove acetylenes, as described above, are also well known. Such processes are described for example in U.S. Patent 2,411,588. In all of these processes it is usually necessary to remove the high boiling polymer (which is formed at the high temperatures necessary for the stripping of the extracted material from the CAA solution) before recycle of the lean solution to the extraction stage.

In the prior art processes such as described above, the preferred method for removal of this polymer is by percolation of the stripped lean solution through a bed of activated char either at high temperatures or preferably at low temperatures. In all of these prior art processes char treating was continued until the char bed was spent whereupon the stream was supplied to a fresh bed of char and the spent char was discarded. According to the present invention it has now been discovered that an improved proces for removing this polymer can be obtained by partially regenerating the spent char from the process and placing a bed of this partially regenerated char before the bed of the fresh activated char. Thus, it has now been found: (1) that the spent char can be cheaply regenerated using a solvent such as isopropanol to about 85% the polymer capacity of fresh char, but to only about 40% of the (removal) activity of fresh char, and (2) that by placing a bed of this regenerated char ahead of the bed of fresh char that thereby a much cheaper process for polymer removal may be obtained.

According to the present invention regeneration is obtained by continuously circulating 1 to 20 volumes, preferably 3 to 8 volumes, specifically 5 volumes of a selective solvent per volume of char through the char bed over the contacting period. The char utilized may be any of the well known commercial activated carbon adsorbents. Thus, wood char, peat char, or preferably coke char may be utilized. It is preferred to utilize these adsorbents in the form of granulated or pilled pellets having a density of 0.45–0.55 gram/ml. Any solvent selected for the removal of polymer may be used. Suitable solvents may be (1) $C_3$ to $C_{10}$ both branched and straight chain aliphatic alcohols, (2) $C_3$ to $C_{10}$ ketones such as methyl isobutyl ketones, methyl ethyl ketones, preferably acetone, (3) $C_6$ to $C_{10}$ aromatics such as benzene, toluene, xylene, preferably benzene and (4) dilute aqueous (0.1 to 1 wt. percent) hydrochloric acid. The preferred solvents are the alcohol solvents such as isopropanol, amyl alcohol, methyl isobutyl carbinol and octyl alcohol. Contacting times for the regeneration of the char should be in the range of 8 to 48, preferably 12 to 24, specifically 16 hours and temperatures of 60 to 180, preferably 80 to 160, specifically 120° F. should be utilized. The spent char bed should be washed thoroughly with cold water (40° to 100° F.) before alcohol treatment and washed after treatment with copious quantities of warm (120° to 180° F.) water. According to this invention ordinarily three vessels will be utilized, two being on-stream while one is on the regeneration cycle. Thus, in this system wherein the CAA solution is passed through a first vessel containing the regenerated char and thence through a second vessel containing the fresh char, the sequence of operations for regeneration is as follows:

(1) Discard the spent regenerated char in the first vessel and replace it with fresh char.

(2) Use this vessel containing fresh char to replace the second vessel.

(3) Pass the second vessel containing spent fresh char to regeneration, and (4) Replace the first vessel with a vessel coming from regeneration containing regenerated char.

It should be noted that the char treating facilities can be bypassed if necessary during switching of vessels without deleteriously affecting $C_4$ extraction obtained (the buildup in polymer will be removed when char treating is resumed).

In the present process utilizing 2-stage (regenerated and fresh char) char treating, similar temperatures and similar contacting rates as utilized in a single vessel fresh char system may be utilized. Levels of polymer which may be present in the stripped CAA solution may be 0.001 to 0.2, usually .01 to 0.1, specifically .05 wt. percent. The cuprous ammonium acetate solutions are made up of a cuprous salt, a fatty acid radical, and an alkaline radical such as ammonia or an organic nitrogen base. Analysis of a typical such solvent is—

| Component: | Range (as moles/liter) |
|---|---|
| Cupric copper | 0.2–0.4 |
| Cuprous copper | 1.5–3.5 |
| Ammonia | 8.0–12.0 |
| Acetate (as acetic acid) | 4.0–7.0 |
| Water (average) | 20–40 |

The composition of the cuprous salt solutions may be varied in many ways well known.

Other reaction conditions are temperatures of 60 to 200° F., preferably 90 to 130° F., specifically 100° F. and contacting rates of 0.5 to 2.0, preferably 0.8 to 1.3, specifically 1 volume of solvent per volume of char per hour.

Replacement of the two beds (i.e., as above outlined) is conducted at various times depending on level of polymer in the CAA solution to be treated and the amount of polymer which may be permitted in the recycle CAA. Thus, for example replacement may be after 100 to 500, preferably 150 to 250, specifically 200 volumes solvent/volume char.

The present invention will be more clearly understood from a consideration of the following example which presents (1) experimental data obtained in the laboratories comparing regenerated activated carbon char with fresh activated carbon (8–30 mesh commercially sold pilled coke char having a density of 0.5 gms./ml.) as to activity and polymer capacity and (2) a rough comparison based on said laboratory data of a system utilizing regenerated char with a system utilizing only fresh char.

TABLE I

*Laboratory Evaluation of Spent Activated Carbon Regenerated With Isopropyl Alcohol vs. Fresh Active Char*

| Days | New Char | | | | Regenerated Spent Char Sample No. 1 [a] | | | | Regenerated Spent Char Sample No. 2 [b] | | | |
|---|---|---|---|---|---|---|---|---|---|---|---|---|
| | Volume CAA/Volume Char (Cumulative) | Sol. Rate, v./v./hr. | Polymer Removal | | Volume CAA/Volume Char (Cumulative) | Sol. Rate, v./v./hr. | Polymer Removal | | Volume CAA/Volume Char (Cumulative) | Sol. Rate, v./v./hr. | Polymer Removal | |
| | | | Wt. Percent | Gram/100 gm. Char (Cumulative) | | | Wt. Percent | Gram/100 gm. Char (Cumulative) | | | Wt. Percent | Gram/100 gm. Char (Cumulative) |
| 2 | 61.6 | 1.2 | 38.0 | 3.81 | 33.7 | 0.7 | 25.4 | 1.16 | 35.5 | 0.7 | 27.3 | 1.3 |
| 5 | 117.2 | 0.9 | 23.2 | 5.67 | 87.8 | 0.8 | 16.4 | 2.36 | 64.6 | | 14.6 | 1.87 |
| 7 | 166.6 | 1.0 | | 6.02 | 137.7 | 1.0 | 7.6 | 2.97 | 104.5 | 0.9 | 15.2 | 2.86 |
| 9 | 222 | 1.2 | 22.0 | 7.36 | 187.0 | 1.0 | 13.2 | 4.06 | 160 | 1.1 | 11.8 | 3.95 |
| 12 | 285 | 0.9 | 10.5 | 8.94 | 250 | 0.9 | 17.6 | 5.91 | 207 | 0.7 | 11.8 | 4.87 |
| 14 | 331 | 1.0 | 20.0 | 10.12 | 274 | 0.5 | 7.1 | 6.21 | 252 | 0.9 | 7.1 | 5.42 |
| 16 | 368 | 0.8 | 8.6 | 10.62 | 316 | 0.9 | 7.8 | 6.82 | 287 | 0.8 | 14.3 | 6.37 |
| 17 | 389 | | 1.4 | 10.67 | | | | | | | (c) | (c) |
| 19 | 417 | 0.4 | 4.0 | 11.02 | 356 | 0.6 | 19.4 | 8.31 | | | | |
| 21 | 465 | 1.0 | 1.3 | 11.46 | 389 | 0.7 | 10.3 | 8.96 | | | | |
| 23 | | | | | 433 | 0.9 | 8.0 | 9.57 | | | | |
| 26 | | | | | 500 | 1.0 | 3.8 | 10.04 | | | | |
| Average | | 0.93 | | | | 0.82 | | | | 0.85 | | |

[a] Regenerated with 3 volumes of 75 vol. % isopropanol per volume of char, followed by water.
[b] Regenerated with 5 volumes of 75 vol. % isopropanol per volume of char, followed by water.
[c] Tube broken.

This comparison of polymer removal using regenerated char as compared to fresh char can be more clearly seen from the plots shown in FIGURE I and FIGURE II. Thus, in FIGURE I a comparison of polymer removal capacity vs. volumes of CAA supplied per volume of char is presented and in FIGURE II a comparison of polymer removal efficiencies per pass vs. volumes of CAA per volume of char supplied is presented. Thus, from these plots it can be seen that the regenerated char has about 85% the capacity of fresh char but removes in one pass only about half the polymer present, whereas fresh char removes essentially all the polymer in one pass.

A rough economic comparison of fresh char costs vs. regenerating char costs has been made and is presented below in Table II.

TABLE II

| | Fresh Char One Charge | Data if 75% additional life is gained by regenerating the one charge with Isopropyl Alcohol |
|---|---|---|
| Average char life, days | 7 | 12. |
| Char in one charge, lbs. | 6,000 | |
| Char cost, per lb. | $0.30 | |
| Total char cost per charge | $1,800 | |
| Solution loss per charge | $500 | |
| Labor cost per charge | $100 | |
| Total cost | $2,400 | $2,400+cost of Isopropyl Alcohol. |
| Cost per day | $343 | $200. |
| Cost per year | $125,000 | $73,000+cost of Isopropyl Alcohol. |
| ISOPROPYL ALCOHOL REQUIREMENTS | | |
| Alcohol required to generate the char 30 times a year (every 12 days) at 1,500 gals. per regeneration | None | 45,000 gals. |
| Alcohol cost at approximately 40¢/gal. | None | $18,000. |
| Total cost per year | $125,000 | $91,000. |
| Savings by using regeneration technique, per year | | $34,000 |

It is to be understood that this invention is not limited to the specific examples, which have been offered merely as illustrations, and that modifications may be made without departing from the spirit of this invention.

What is claimed is:

1. In a process wherein cuprous ammonium acetate is utilized as a solvent to selectively remove unsaturated hydrocarbons from a hydrocarbon stream, wherein high boiling polymer is formed in the process in stripping unsaturates from the fat cuprous ammonium acetate solution, and wherein high boiling polymer is removed from the solution before recycle to the extraction stage by passing the lean stripped solution through a bed of fresh activated char, the improvement which comprises passing the stripped solution prior to its being supplied to the bed of fresh activated char, first through a bed of spent char incapable of being economically regenerated to the capacity of fresh char which has been partially regenerated by removing polymer from said char with a solvent selected from the group consisting of $C_3$–$C_{10}$ aliphatic alcohols, $C_3$–$C_{10}$ aliphatic ketones, $C_6$–$C_{10}$ aromatics, and 0.1 to 1 weight percent aqueous hydrochloric acid.

2. The process of claim 1 in which the unsaturated hydrocarbon removed from the hydrocarbon stream is butadiene and the hydrocarbon stream is a $C_4$ stream from steam cracking.

3. The process of claim 1 in which the unsaturated hydrocarbon removed from a hydrocarbon stream is acetylene and the hydrocarbon stream is a $C_4$ stream from steam cracking.

4. The process of claim 1 in which the solvent utilized in regeneration of the char is isopropyl alcohol.

References Cited in the file of this patent

UNITED STATES PATENTS

| | | |
|---|---|---|
| 2,604,485 | Booker et al. | July 22, 1952 |
| 2,818,457 | McDonald | Dec. 31, 1957 |